(No Model.) 2 Sheets—Sheet 1.
J. W. BROWN.
CULTIVATOR.
No. 496,850. Patented May 9, 1893.
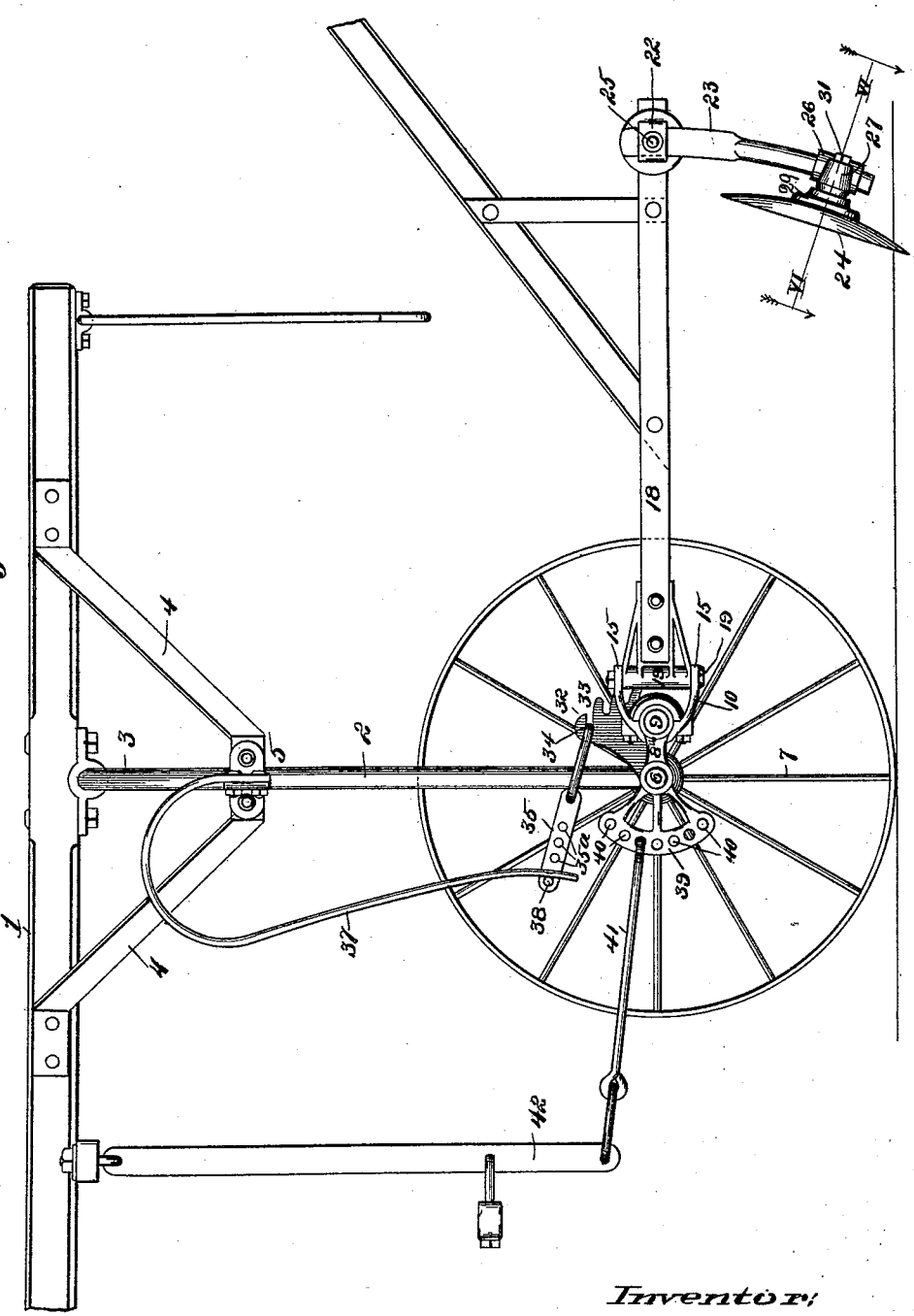
Fig. I.
Attest:
Geo. E. Cruse.
Harry D. Rohrer.
Inventor:
John W. Brown.
By Knight Bros.
Attys.

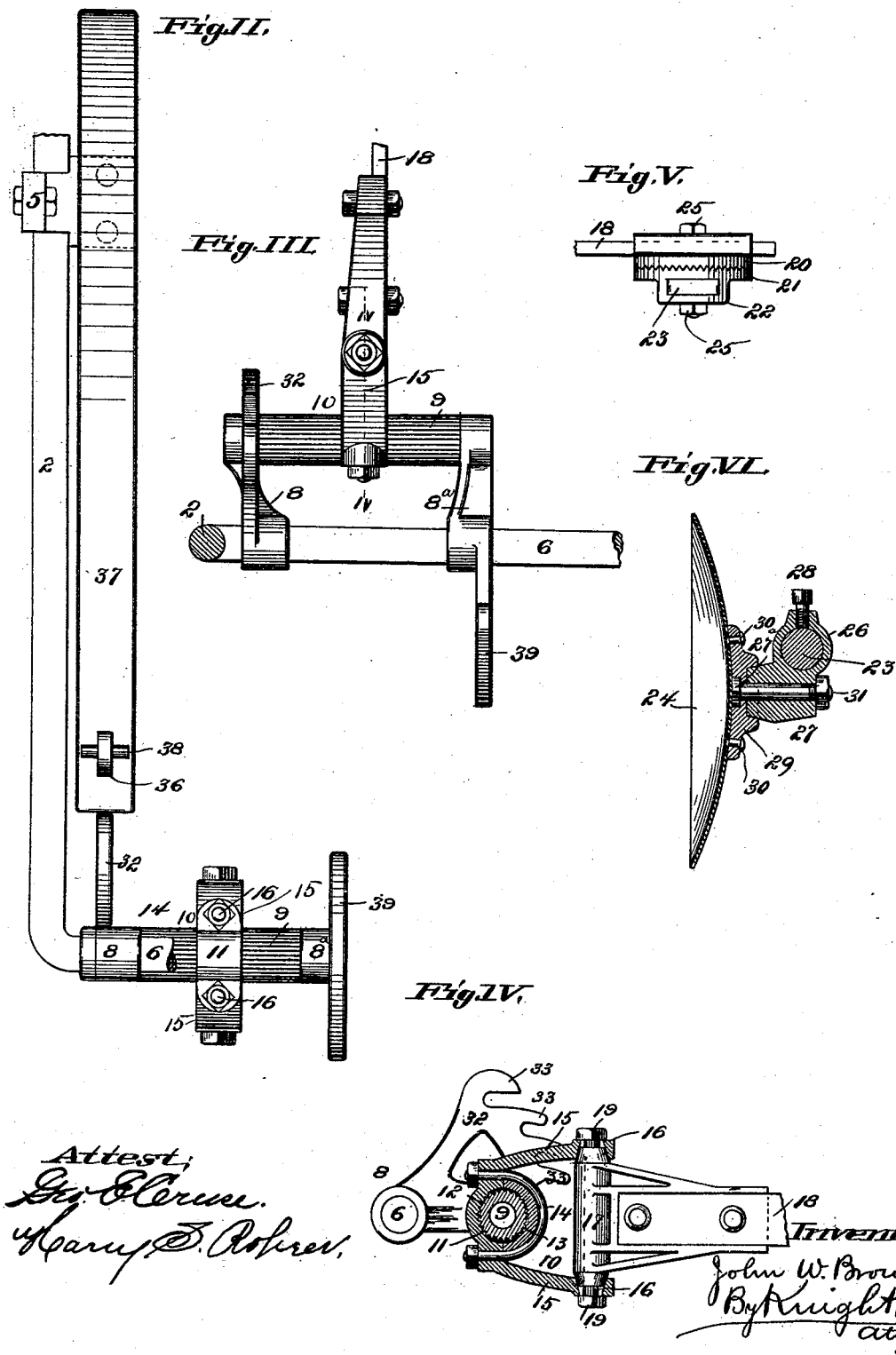

UNITED STATES PATENT OFFICE.

JOHN W. BROWN, OF QUINCY, ILLINOIS, ASSIGNOR TO THE COLLINS PLOW COMPANY, OF SAME PLACE.

CULTIVATOR.

SPECIFICATION forming part of Letters Patent No. 496,850, dated May 9, 1893.

Application filed April 20, 1892. Serial No. 429,937. (No model.)

*To all whom it may concern:*

Be it known that I, JOHN W. BROWN, of Quincy, in the county of Adams and State of Illinois, have invented a certain new and useful Improvement in Cultivators, of which the following is a full, clear, and exact description, reference being had to the accompanying drawings, forming part of this specification.

This invention relates to the devices described and claimed for connecting the plow beams to the arched axle and to the plow.

Figure I is a detail side elevation of part of a cultivator illustrating my invention. Fig. II is an enlarged detail front elevation, the wheel spindle being broken away. Fig. III is a detail top view of the rocking frame to which the beam is adjustably connected. Fig. IV is a vertical, longitudinal section taken at IV—IV, Fig. III. Fig. V is a top view of the adjusting device of the cultivator disk shank. Fig. VI is an enlarged axial section of the disk, &c., taken at VI—VI, Fig. I.

1 is an elevated longitudinal beam to which the arched axle 2 is secured at its upper part 3.

4 are braces extending from the beam 1 to a clip 5 on the axle. The axle is turned out at the lower ends forming the spindles 6 of the ground wheels 7.

8 8$^a$ are crank arms free to turn on the spindle and connected together by a cylindrical bar 9 with ribs and grooves extending from end to end. The crank arms have no endwise movement on the spindle.

10 is a clevis having a box 11 bearing against the front side of the bar 9 and having ribs and grooves 12 at the central part of its bearing, engaging the ribs and grooves of the bar 9, see Fig. IV.

13 is a box held against the rear side of the bar 9 by a clip 14. The box 13 is also ribbed to engage the rear side of the bar 9. The side arms 15 of the clevis have sockets 16 in which the ends of the upright cross bar 17 of the beam 18 have bearing. The sockets and the bearing ends of the cross bar are preferably made conical so that wear may be compensated for by contracting the ends of the clevis on the bar. For this purpose a screw bolt 19 passes endwise through the crossbar and has its head and nut bearing against the arms of the clevis. To the side of the beam 18 at the rear end is fixed a circular plate 20 having radial ribs upon its vertical face.

21 is a socket plate or block having a radially ribbed face matching the face of the block 20 and having a socket or mortise 22 to receive the shank 23 of the cultivator disk 24.

I do not confine myself to the use of the disk 24 as any suitable plow share or cutter may be used. A rotary cutter disk will however be shown and described in this connection. The socket block or plate 21 is secured to the plate 20 by a bolt 25 that passes through its center and also the center of the plate 20 and through the beam. After loosening the nut of the bolt 25 the plate 21 may be turned on the plate 20 and thus the inclination of the shank 23 may be changed. On the tightening of the nut the shank is fixed in position by the engagement together of the corrugated faces of the plates 20, 21. The part of the shank passing through the mortise 22 is preferably flat but its lower part is round and passes through a socket 26 of a block 27 to which the concavo-convex cultivator disk 24 is so secured that it has free rotation.

28 is a set-screw working in the socket 26 and whose end bears upon the shank. The construction allows the disk to be fixed at any angle upon the shank so as to throw the earth more or less to either side. The disk has at its rear a block 29 secured centrally upon it by rivets or bolts 30.

31 is a pivot bolt passing centrally through the block 29, the head of the bolt fitting loosely in a recess of the block. The bolt passes through the head of the block 27, and is secured by a nut at its rear end. The front end 27$^a$ of the head has bearing in a recess at the back of the block 29 so that it bears against the head in turning.

32 is a plate extending upwardly from one of the crank arms 8. The plate has a number of hooks or fingers 33 adapted to engage a link 34 that is connected to a bar 35. The bar 35 passes through a mortise 36 in the free end of a spring 37 whose upper end is attached to the clip 5.

38 is a pin or key that is put into either of the holes 35ᵃ of the bar 35, the pin bearing against the front side of the spring.

39 is a plate extending forwardly from a crank arm 8ᵃ and having a number of bolt holes 40, for the attachment of the draft rod 41 that is connected to the hanging draft bar 42.

The front end of the beam 18 has transverse adjustment by moving it along the bar 9, and has vertical adjustment by raising or lowering the bar 9 within the boxes 11, 13 after the clip 14 has been made loose and then making the clip tight so as to retain the adjustment. As the front end of the beam 18 is raised by the adjustment of the boxes on the bar 9 the plate 39 is of course depressed and the draft rod may be changed from one bolt hole 40 to another if desired. The position of the attachment of the draft rod 41 with the plate 39 determines, to a great extent, the position of the disk 24 relatively to the ground, for if the draft rod inclines upward it will tend to throw down the disk by lifting the front edge of the plate 39, and vice versa. The force of the spring 37 goes to lift the disk, and this force is increased or diminished by changing the position of the pin 38 against which the spring bears and by changing the link 24 from one to another of the hooks 33.

I have cast the arms 8 8ᵃ integral with the bar 9 and prefer this construction. It is, however, not essential.

I claim as my invention—

1. The combination of a crank arm 8 rocking on a spindle 6 and carrying a draft-plate 39 and a bar 9, the latter parallel with the spindle and having ribbed surface, the clevis 15 having boxes with ribbed faces engaging the bar 9 and the beam 18 connected to the clevis, all constructed to operate substantially as set forth.

2. The combination of the beam 18 having a cross-head 17 with conical bearing ends, the clevis 15 with conical sockets fitting said ends, the bolt 19 boxes 11, 13 upon the clevis having ribbed bearing faces, bar 9 with ribbed surface engaged by the boxes, crank-arms 8 upon the bar 9 and a spindle 6 upon which the crank arms rock, substantially as, and for the purpose set forth.

3. The combination with the plow beam of crank-arms 8 8ᵃ rocking on a spindle, as 6, a plate 32 attached to the crank arm, a spring 37 adjustably connected to the plate, a bar 9 upon the crank arm, and a plow clevis with boxes engaging the bar, all substantially as set forth.

4. The combination of the clevis 15 having boxes 11, 13, the bar 9 engaged by the boxes, crank arm 8 attached to the bar 9 and rocking on a spindle 6, a plate 32 attached to the crank arm, a spring 37 and adjustable connection between the spring and the plate or projection 32, substantially as, and for the purpose set forth.

5. In a wheel cultivator, the bar 9 with crank arms 8ᵃ, a spindle on the main frame upon which the crank arms swing, a projection 32 on said bar, a spring on the main frame adjustably connected to said projection, and the beam 18 connected to the said bar, all substantially as and for the purpose set forth.

JOHN W. BROWN.

In presence of—
WM. N. BROWN,
JOHN A. FARMER.